(12) United States Patent
Brunet (10) Patent No.: US 7,993,709 B2
(45) Date of Patent: Aug. 9, 2011

(54) PROCESS FOR TREATING LIGNOCELLULOSIC MATERIAL, AND APPARATUS FOR CARRYING OUT THE SAME

(75) Inventor: André Brunet, Amos (CA)

(73) Assignee: 9103-7366 Québec Inc., Québec (CA)

( * ) Notice: Subject to any disclaimer, the term of this patent is extended or adjusted under 35 U.S.C. 154(b) by 721 days.

(21) Appl. No.: 11/663,928

(22) PCT Filed: Sep. 27, 2005

(86) PCT No.: PCT/CA2005/001478
§ 371 (c)(1),
(2), (4) Date: Jun. 18, 2008

(87) PCT Pub. No.: WO2006/034581
PCT Pub. Date: Apr. 6, 2006

(65) Prior Publication Data
US 2008/0263891 A1 Oct. 30, 2008

(30) Foreign Application Priority Data
Sep. 27, 2004 (CA) .................................. 2482571

(51) Int. Cl.
*B05D 1/18* (2006.01)
(52) U.S. Cl. ................. 427/440; 427/439; 427/430.1
(58) Field of Classification Search ............... 427/430.1, 427/439, 440
See application file for complete search history.

(56) References Cited

U.S. PATENT DOCUMENTS

| 1,366,225 | A | * | 1/1921 | Weiss | 34/396 |
| 1,388,225 | A |   | 1/1921 | Weiss |  |
| 1,469,976 | A | * | 10/1923 | Walsh | 34/535 |
| 2,830,382 | A | * | 4/1958 | Petersen | 34/546 |
| 4,816,572 | A |   | 3/1989 | Bourgeois |  |
| 5,934,659 | A | * | 8/1999 | Johnson | 269/237 |
| 2004/0148795 | A1 | * | 8/2004 | Bernon et al. | 34/219 |

FOREIGN PATENT DOCUMENTS
CA 1091871 12/1980
CA 2162374 11/1994

* cited by examiner

*Primary Examiner* — David Turocy
(74) *Attorney, Agent, or Firm* — Knobbe Martens Olson & Bear LLP (57) ABSTRACT

A process for treating lignocellulosic material, such as wood for example, the process including the steps of: a) providing lignocellulosic material; b) evaluating parameters of the lignocellulosic material; c) preparing the lignocellulosic material; d) heating the lignocellulosic material in a treatment chamber following a given profile based on parameters of the lignocellulosic material; e) stabilizing the lignocellulosic material; and f) cooling down the lignocellulosic material. The process enables to improve the quality of the wood being treated, while ensuring a greater repeatability and uniformity of coloring results, and overcoming drawbacks associated with conventional torrefaction methods.

18 Claims, 6 Drawing Sheets

PROCESS FOR TREATING LIGNOCELLULOSIC MATERIAL, AND APPARATUS FOR CARRYING OUT THE SAME

This application is a 371 of PCT/CA/2005/001478 filed Sep. 27, 2005, which claims the priority Canadian Patent Application No. 2,482,571, filed Sep. 27, 2004 the content of which is incorporated herein by reference.

FIELD OF THE INVENTION

The present invention relates to a process for treating lignocellulosic material, such as wood and the like, and also relates to an apparatus for carrying out the process. More particularly, the present invention relates to a process for improving the quality of wood to be treated by roasting the wood with a multi-step process, including treatment at a high temperature gradient.

BACKGROUND OF THE INVENTION

Torrefaction is an artisanal technique that has been used for centuries to enhance the esthetic and physical features of wood. Since torrefaction compares favourably with chemical treatment of wood, there is ever increasing interest in the many industrial applications for this process.

Torrefaction involves heating wood at relatively high temperatures to improve the properties of the wood without the addition of chemicals or toxic substances.

This natural process increases the durability and stability of wood, while enhancing the esthetic value of individual wood species. Torrefaction is a type of heat treatment that increases the density of the wood, improves its dimensional stability and gives it rich, balanced overtones similar to the look of exotic wood species.

There exist also several technologies for the curing, roasting and/or stabilizing of wood, and some of these inventions date back several years as well.

Indeed, known in the art are the following US patents and patent applications: U.S. Pat. Nos. 4,233,752; 4,345,384; 4,787,917; 5,123,177; 5,555,642; 5,678,324; 5,901,463; 5,926,968; 5,992,043; and 6,374,513.

Also known in the art are the following CA patents and patent applications: 356,430; 684,915; 1,091,871; 1,109,251; 1,133,205; and 1,159,643.

However, many problems still continue to persist despite recent advances in the technology, deterring wood manufacturers from using such inventions for the fabrication of floors, furniture, decks, etc.

Such problems include staining, where the resin/acid drawn out of the wood during the roasting process remains on the surface of the wood until cool down, causing stains on the wood. In other instances, uniformity has been identified as a substantial problem, where the wood becomes darker on the ends and lighter in the middle of the planks, leaving wood manufacturers to stockpile a variety of unwanted colors. Beyond the problem of uniformity of color, there seems to be a problem with roasting devices being unable to offer customers a customization option for roasting color. In other instances, roasting of wood is found to be very time consuming and thus, very costly. In other instances, fire hazards appear to be at the heart of the matter, forcing operators to introduce inert gases or operate entirely with a negative pressure. Finally, key to the problems faced by current wood roasting devices and/or methods: the lack of automation in the roasting process, forcing operators to make intuitive decisions regarding the outcome within the roasting apparatus, further affecting the lack of uniformity of the wood.

Hence, in light of the above-discussed, there is a need for an improved process and/or apparatus which would be able to overcome some of the aforementioned prior art problems.

SUMMARY OF THE INVENTION

The object of the present invention is to provide a process for treating lignocellulosic material which, by virtue of its features and steps, satisfies some of the above-mentioned needs, and which is thus an improvement over other related processes known in the prior art.

In accordance with the present invention, the above object is achieved by a process for treating lignocellulosic material, the process comprising the steps of:
 a) providing lignocellulosic material;
 b) evaluating parameters of the lignocellulosic material;
 c) preparing the lignocellulosic material;
 d) heating the lignocellulosic material in a treatment chamber following a given profile based on parameters of the lignocellulosic material;
 e) stabilizing the lignocellulosic material; and
 f) cooling down the lignocellulosic material.

According to another aspect of the present invention, and as will be easily understood, there is also provided an apparatus such as the one briefly described herein and such as the one exemplified in the accompanied drawings.

According to yet another aspect of the present invention, there is also provided a treatment plant provided with the above-mentioned apparatus.

According to yet another aspect of the present invention, there is also provided a method of operating the above-mentioned apparatus, and a corresponding operating software.

According to yet another aspect of the present invention, there is also provided a material having been treated with the above-mentioned process, apparatus and/or method.

The objects, advantages and other features of the present invention will become more apparent upon reading of the following non-restrictive description of preferred embodiments thereof, given for the purpose of exemplification, only with reference to the accompanying drawings.

DETAILED DESCRIPTION OF PREFERRED EMBODIMENTS OF THE INVENTION

In the following description, the same numerical references refer to similar elements. The embodiments shown in the figures, and the physical dimensions exemplified herein, are preferred.

Moreover, although the present invention was primarily designed for use with lignocellulosic material, such wood for example, it may be used with other types of objects and in other fields, as apparent to a person skilled in the art. For this reason, expressions such as "lignocellulosic", "wood", etc. used herein should not be taken as to limit the scope of the present invention and includes all other kinds of items with which the present invention could be used and may be useful.

Moreover, in the context of the present invention, the expressions "machine", "apparatus", "device", and any other equivalent expression known in the art will be used interchangeably. Furthermore, the same applies for any other mutually equivalent expressions, such as "lignocellulosic material" and "wood", "treating", "processing", "torrefying", "coloring" and "roasting", as well as "method", "process" and "operation" for example, as also apparent to a person skilled in the art.

In addition, although the preferred embodiment of the present invention as illustrated in the accompanying drawings comprises various components and although the preferred embodiment of the apparatus as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the apparatus and corresponding parts according to the present invention, as briefly explained and inferred herein, without departing from the scope of the invention.

Broadly described, the apparatus according to the present invention, as shown in the accompanying drawings, is used for carrying out a process for stabilizing wood such that it remains stable over time. Also disclosed is a method for coloring wood by heat treatment of lignocellulosic material where the material is pre-heated at an elevated temperature. Preferably, this includes clamping down wood to be treated in a chamber prior to a 4-step roasting process at a pre-determined temperature in an electric chamber to extract the water and acidity/resin by destroying part of the hemicellulose of the wood. Preferably also, the method comprises the calculation of a theoretical "area of coloration" of the wood. Uniformity of color is preferably achieved by providing wood with a transverse air-flow as well as a positive pressure upon heating and a negative pressure upon cooling.

The present invention also relates to a method of improving the quality of wood, by roasting wood with a high temperature treatment. Different degrees of roasting provide a selection of colors. The present invention also relates to the ventilation, evacuation and pressure systems, insuring a stain-free product, a short duration of process, as well as a fire safe process.

According to the preferred embodiment of the present invention, the process for roasting wood preferably includes the following steps: a) evaluation of wood; b) preparation of wood; c) preparation of stabilization software program; d) phase 1: heating (part 1); e) phase 2: heating (part 2); f) phase 3: stabilization of wood; and g) phase 4: cool down.

Prior to roasting lignocellulose materials, a few steps are required.

First, said material, in this case "wood", is preferably identified by type, thickness, length and humidity level. Humidity level is evaluated. For optimal operation of apparatus, a maximum of about 10% of humidity in the wood ensures uniformity of coloration.

Then, said wood is prepared, where load of wood is preferably stacked with hollow tubing spacers. This ensures that wood in the middle of the pile can benefit from air circulation and heat equal to wood at the top of the stack, as can be easily understood by a person skilled in the art.

Figure 1:
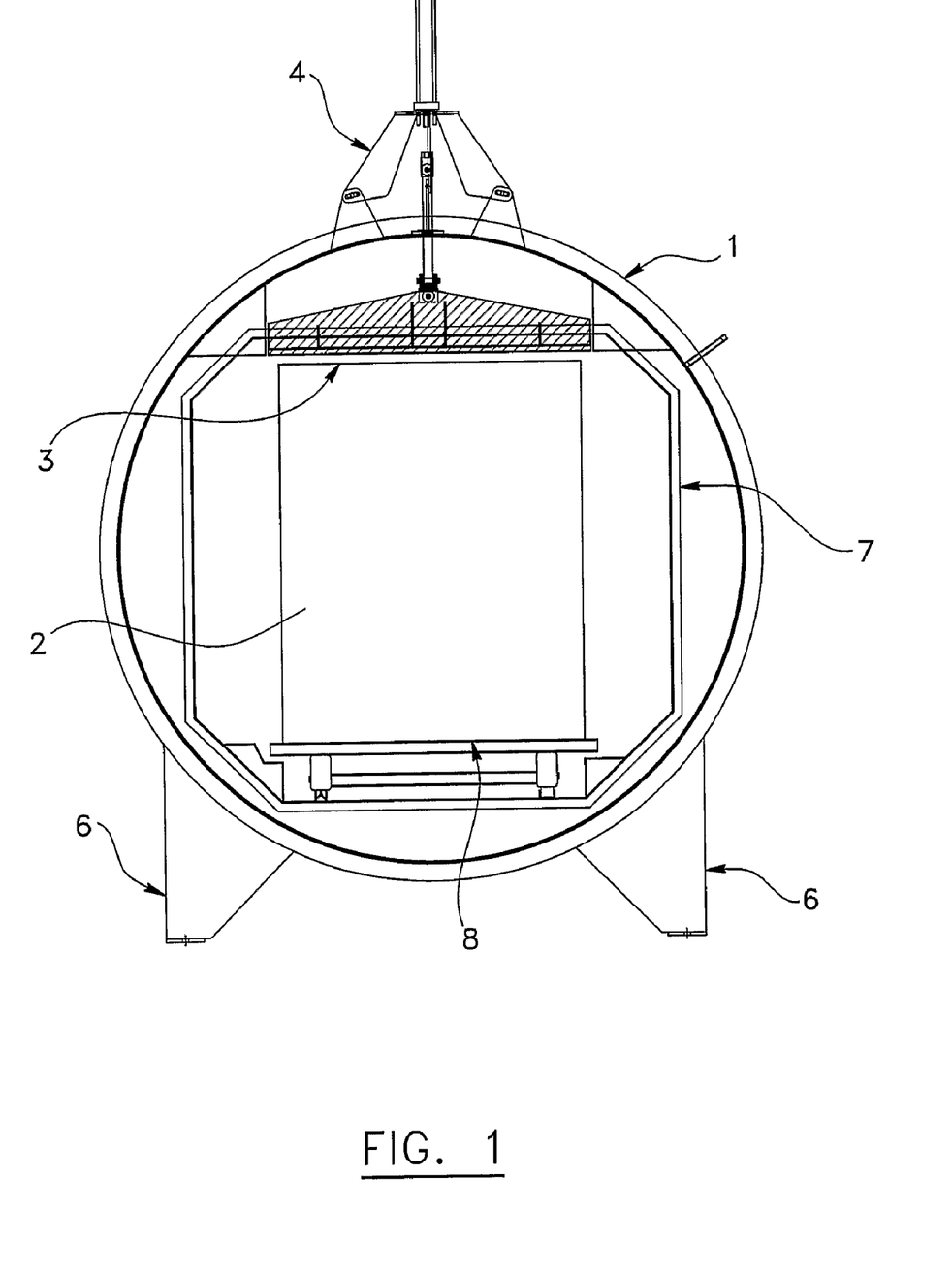
FIG. 1 is a front view of an apparatus according to a preferred embodiment of the present invention, the apparatus being shown provided with a door where material to be treated is entered.

Referring now to FIG. 1, there is shown a front view of the apparatus according to a preferred embodiment of the invention. It preferably comprises rounded external walls 1, and a sealable door 2, where the load is entered. A ceiling 3, internal walls 7 and a floor 8 ensure the possible preferred volume of about 8.2 meters that can be roasted at once. Legs 6 and 6' keep the apparatus off the floor by about 0.35 meters. Preferably, when loading the apparatus with said wood, thermocouples are entered into ends of the wood, dispersed throughout the load to measure average temperature. The software uses these sensors to make further decisions about the desired roasting. A pressure is automatically applied throughout the load with preferably 50-75 kg approximately throughout the process. This compressing jack 4 minimizes warping and bending in the process. When the load has been properly entered in the apparatus, the door is sealed.

Once the load is properly placed in the treatment chamber, the roasting program is set up. The variables for the said wood load are entered in the program interface, for example: type of wood, thickness, length, humidity level and desired color. Unlike other similar inventions, this apparatus provides the choice of a specific level of wood roasting, from lighter color to darker color.

The program is launched, using the required data. The program is automated based on the input data and continuous temperature monitoring by the thermocouples in the wood and by measuring the temperature of the ambient air inside said treatment chamber.

Figure 2:
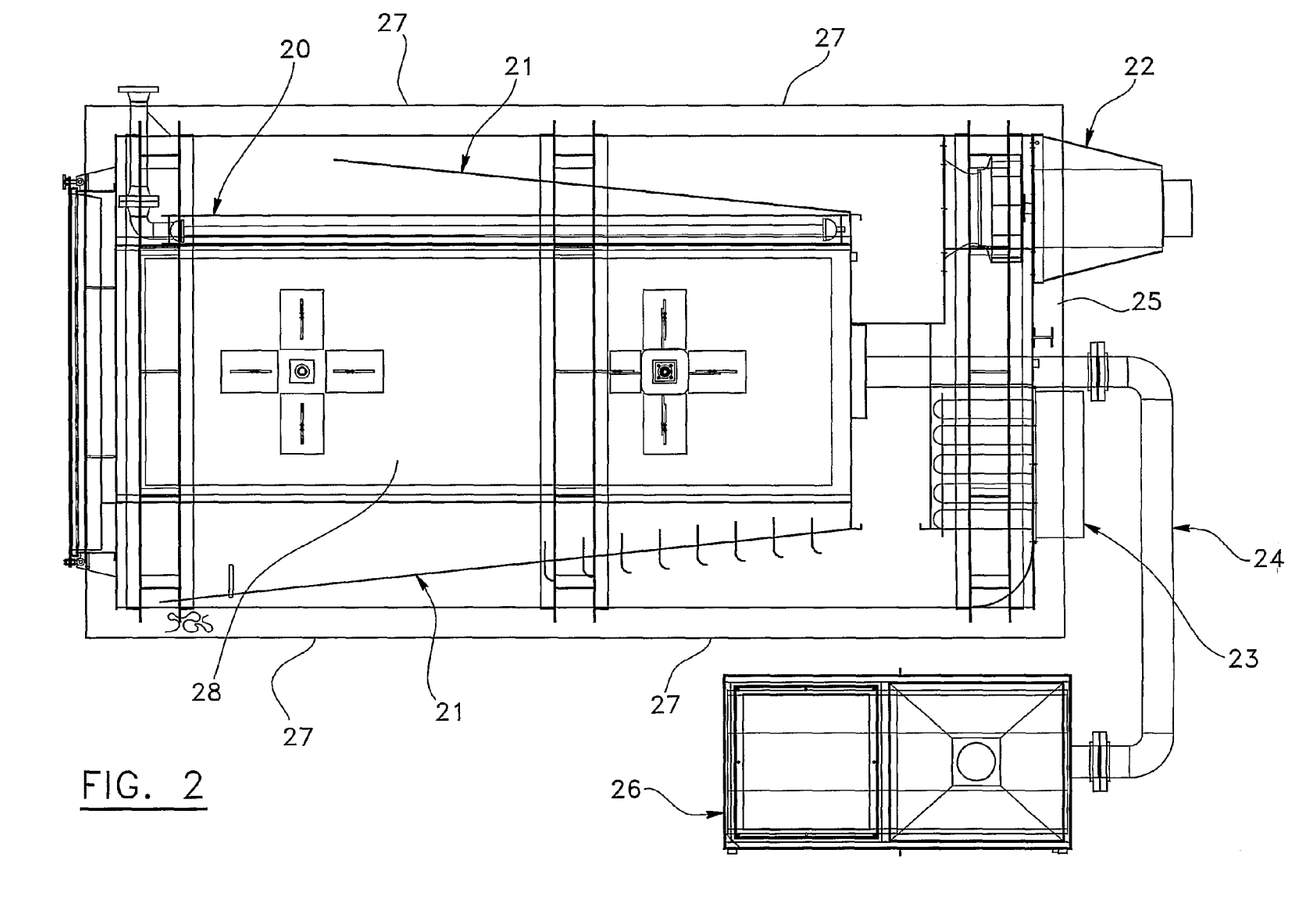
FIG. 2 is a top view of what is shown in FIG. 1.

Referring now to FIG. 2, there is shown a top view of the apparatus. The wood load is placed in treatment chamber 28. Surrounding the treatment chamber is preferably a variety of components that enable proper roasting of the said wood. Preferably, a heater 23 made up of three (3) elements enables heating. It should be noted that three (3) elements offer overcapacity, in the case of breakdown, thus ensuring no loss in productivity. A fan 22 is positioned next to the heating elements. This fan ensures a transverse airflow throughout the load. Deflectors 21 and 21' are located at angle on both sides of the load. These deflectors are preferably perforated with holes that are proportional to their distance from the heater and fan, insuring equal airflow everywhere in the treatment chamber. A louver 25, gas pipe 24 and water basin 26 ensure the required air pressure, as can be easily understood by a person skilled in the art. These will be discussed in further detail hereinbelow. Finally, water sprinklers 27 and 27' enable to re-inject water into the treatment chamber during cool down to accelerate the process.

During the roasting process, the resins in coniferous wood and acids in deciduous wood are drawn to the surface.

Because of transverse circulation through the apparatus (processing/wood stack) area, these by-products are channeled to the outside walls of the chamber instead of being left to deposit on the wood. This transverse circulation through the apparatus is central to the process as it ensures that the resins and acids do not stain the wood, leaving an even color throughout the product.

Figure 3:
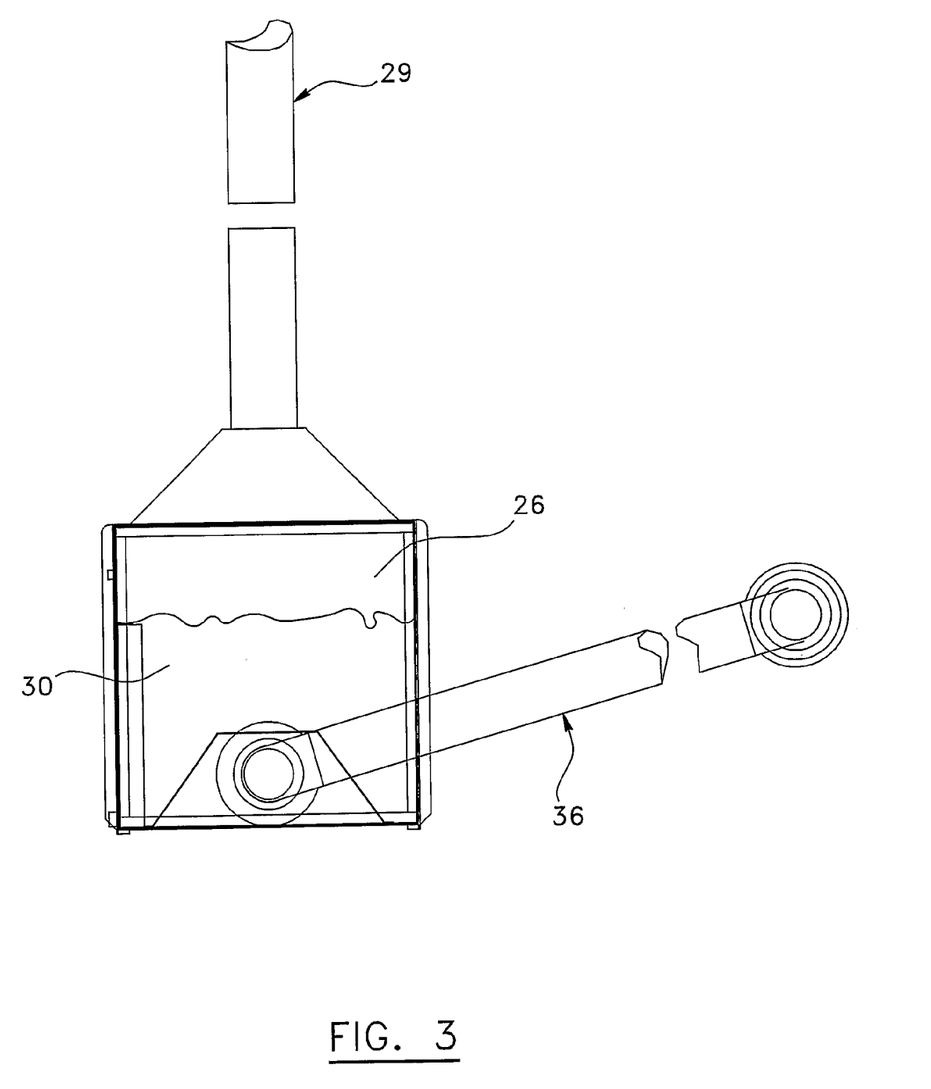
FIG. 3 is a side view of a water basin of the apparatus according to a preferred embodiment of the present invention.

Referring now to FIG. 3, there is shown a side view of the water basin 26. A gas pipe 36 joins the treatment chamber to the water basin. Although low near the ground the gas pipes, it preferably opens near the top of the treatment chamber. The reason the gas pipe opens near the top of the treatment chamber is to eliminate the chance that the water from the water basin will flow back into the treatment chamber when cooling occurs and the apparatus moves into a state of negative pressure. The water basin is filled with a certain volume of water 30 meant to maintain preferably a 0.5 kg (approx.) of pressure inside the treatment chamber during heating and roasting.

During heating and roasting, gases evaporate from the wood. These gases are being circulated inside the treatment chamber by the fan. Some of the gases end up clinging to the walls of the apparatus, falling to the floor. Others are evacuated by the gas pipe when the pressure inside the treatment chamber becomes greater than 0.5 kg.

Through the pipe, the gases are led to the water basin, where dust and particles are left in the water itself. Residual gases continue onward to a vertical evacuation pipe 29.

Figure 4:
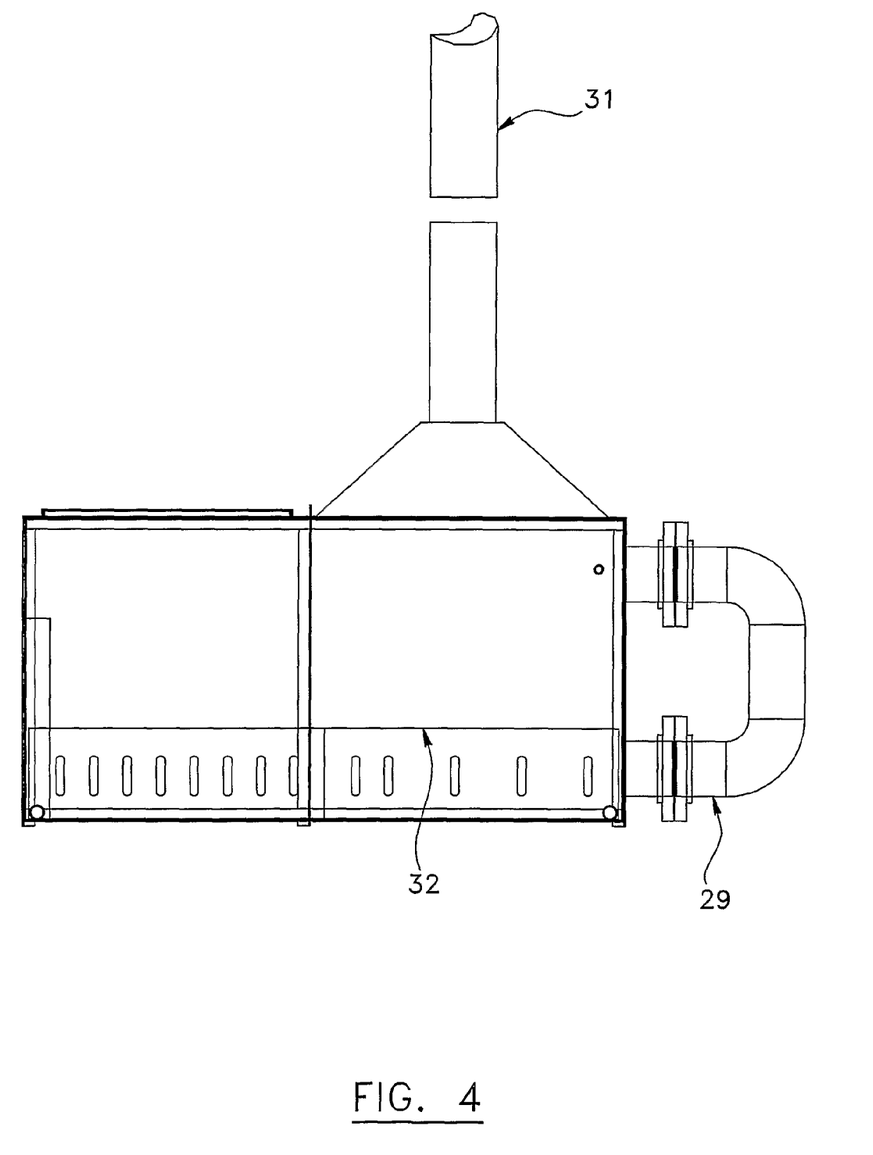
FIG. 4 is a side view of a combustion chamber of the apparatus according to a preferred embodiment of the present invention.

Referring now to FIG. 4, there is shown the combustion chamber. Gases enter the chamber from the evacuation pipe 29. The gases are preferably burnt by a suitable gas, such as propane 32, reducing gas emissions before being released out into the atmosphere by suitable evacuating means, such as chimney 31, for example.

Figure 5:
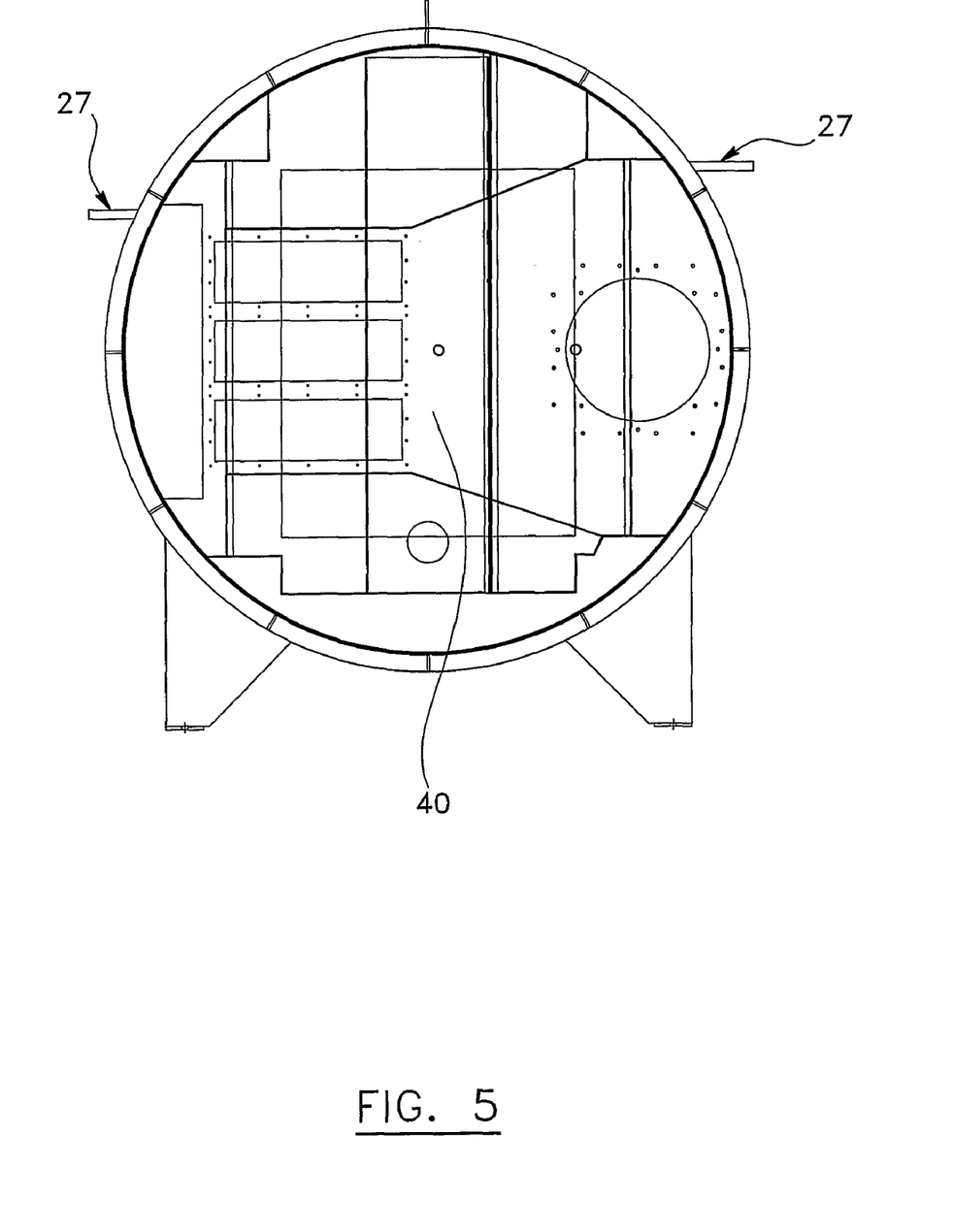
FIG. 5 is a rear view of what is shown in FIG. 1, the opposite end from the door being shown.

Referring now to FIG. 5, there is shown the back view of the apparatus. A louver 25 is located half way up from the floor. Sprinklers 27 and 27' are located on both sides. When the said material is finished roasting, cool down begins. As the said wood contains practically no more moisture and the temperature is declining within the treatment chamber, a negative pressure automatically forms inside the treatment chamber. This negative pressure is confirmed by the water level in the water basin, which lowers, as the gas pipe 36 begins to fill towards the treatment chamber. Louver 25, which weighs approximately 0.25 to 0.5 kg, is installed inside the treatment chamber. As such, when the negative pressure within the treatment chamber becomes greater than 0.5 kg, the louver opens for a moment, allowing the treatment chamber to calibrate back. This calibration to a light negative pressure ensures that the apparatus does not collapse inward or that the water from the basin spills dust and particle filled water back into the chamber, as can be easily understood by a person skilled in the art. Further, it keeps the wood apparatus from getting too much oxygen, thus, causing a risk of ignition within the treatment chamber. Water sprinklers 27 and 27' accelerate the cool down period of the wood. In addition, it provides the wood with some humidity, ranging from about 0.5% to about 3.0%. This re-humidification is made possible as the inside of each piece of wood is itself in negative pressure compared to the ambient pressure inside the treatment chamber, a state which naturally takes place as a result of the high temperature treatment of the wood. This immediate re-humidification further stabilizes the wood, which is clamped down into the chamber by compression jack 4.

Figure 6:
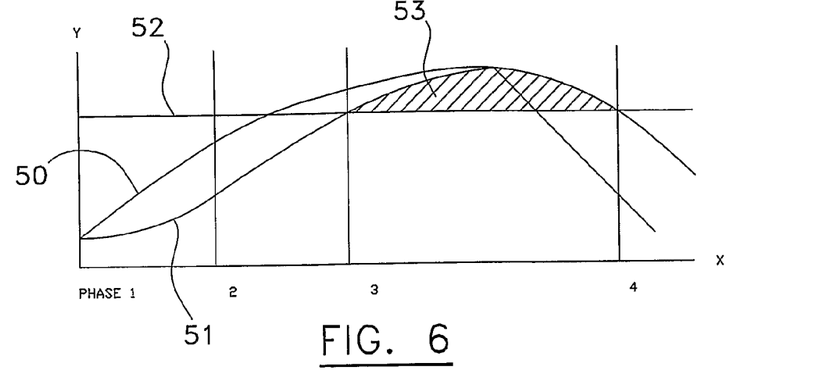
FIG. 6 is a graph illustrating the preferred four phases of roasting wood with a process and/or apparatus according to the present invention.

Referring now to FIG. 6, there is shown a preferred graph of the four (4) phases of roasting. The X-axis, split in four (4) phases, measures time, while the Y-axis measures the temperature in degrees Celsius. This graph shows the treatment chamber temperature line 50, the wood temperature line 51, the critical temperature line 52 and the area of coloration 53. During Phase 1, the wood is preferably heated from its original temperature to approximately 120° C. During this phase, the software calculates the necessary differential in temperature between the chamber and the wood. This differential is based on an algorithm taking account of wood's humidity, type and thickness, the required minimum difference being approximately 75° C. This differential prevents cracking of the wood. Phase 2 begins when the wood has reached the intermediate temperature of approximately 120° C. At this point, the program calculates a reduction in differential between wood temperature and treatment chamber, as the wood is now safe from cracking. Phase 2 has the purpose of further reducing the humidity within the wood, bringing wood moisture down to about 0-2%. This takes place within the preferred range of about 120° C. and 180° C. Roasting occurs in Phase 3 and cooling in Phase 4. These are further explained in reference to the next figures.

Figure 7:
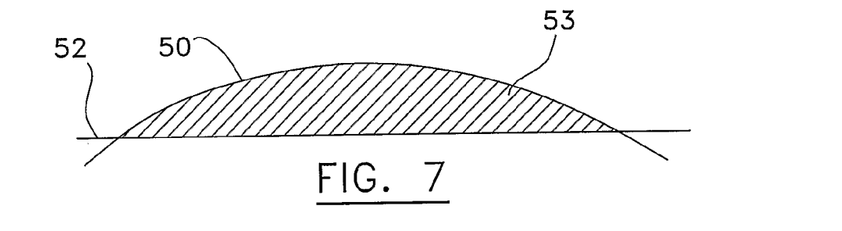
FIG. 7 is a preferred graph illustrating the area of coloration, obtained during "phase 3" of the roasting process according to the present invention.

Referring now to FIG. 7, there is shown a close up view of FIG. 6, showing the intersection of the wood temperature line 51 with the critical temperature line 52, together forming the area of coloration 53. As such, the third phase begins when the wood has reached the required critical temperature. During this stage the wood begins to roast, hemicellulose being broken down and polymerized. Once the wood temperature line 51 crosses over the critical temperature line 52, the program begins calculating the "area of coloration" 53 every four (4) seconds, preferably.

Figure 8:
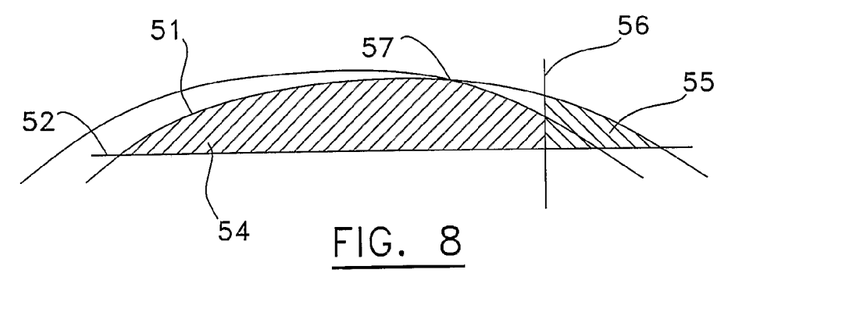
FIG. 8 is a preferred graph illustrating the area of coloration during the roasting process according to the present invention, where preferably, every four seconds, the software calculates the anticipated area by calculating the acquired area.

Referring now to FIG. 8, there is shown another view of FIG. 7, adding the element of time. Again, looking at the area of coloration, this time it is split up between the time line 56, dividing the "acquired area" 54 and the "anticipated area" 55. As such, we find that the "area of coloration" 53 is the sum of the "area already acquired"+the "anticipated area". The program calculates what total "area of coloration" will give the desired color based on the algorithm taking into account wood type, wood thickness, temperature of the wood temperature line 51 and treatment chamber temperature line 50. The software makes a different calculation when the temperature of the treatment chamber intersects with the wood temperature line. This intersection 57 provides a ceiling to the temperature of the wood and allows further calculation of the "area of coloration" ensuring that the wood does not exceed approximately 225° C. while meeting the desired color.

The critical temperature varies based on the type of wood. In addition, it should be noted that the area called "area of coloration" varies based on the aforementioned variables, notably: desired color, type of wood and thickness. As such, the software running the said apparatus creates a heating profile for the wood such that the "area of coloration" provides the desired wood color of final product. The greater the "area of coloration", the darker the coloration.

When the wood crosses the critical temperature line 52, cool down officially begins. The heating elements are stopped. Air is allowed to circulate without added heat. External radiators are engaged to speed up the cooling process of the wood. To speed up the cooling process, water is sprayed inside the chamber. As the wood lowers substantially in temperature, water vapors begin to be absorbed by the wood. By the time Phase 4 of cooling is finished, wood has typically reabsorbed about 1 to 5% of moisture.

It should be noted that at this stage of the process, it is possible to inject stain, paint, perfume, plastic, protective liquid to coat the wood/or be absorbed by the wood during the cool down phase.

Figure 9:
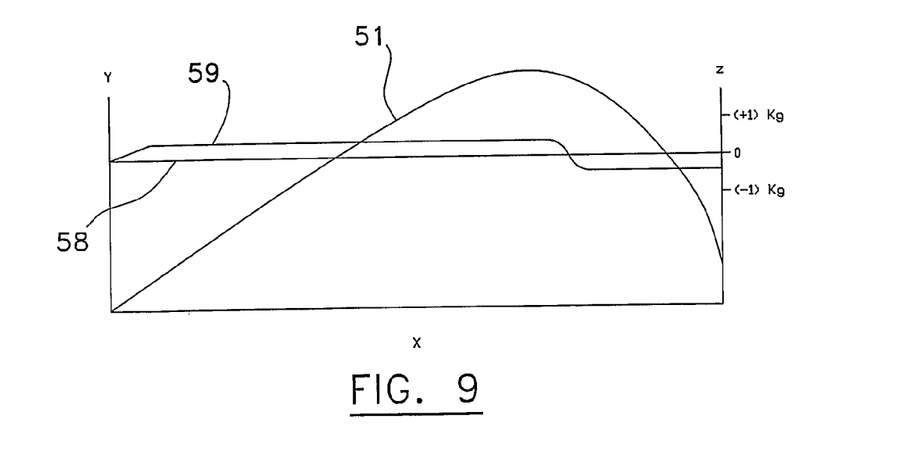
FIG. 9 is a preferred graph illustrating the positive and negative pressure during the roasting process according to the present invention.

Referring now to FIG. 9, there is shown a graph showing the X-axis, representing time. The Y-axis represents the temperature in Celsius while the Z-axis represents the pressure scale, divided by a dotted line 58, for zero being equal to the ambient atmosphere. This graph shows the relationship between the roasting process and the positive and negative pressure within the treatment chamber. More specifically, the wood temperature line 51 against the pressure line 59. As the temperature inside the treatment chamber rises, so does the pressure line. The said pressure line stabilizes at approximately 0.5 kg, due to the water basin system that is linked to the treatment chamber by a gas pipe. During cool down, the pressure line crosses the zero mark, descending into negative pressure and stabilizing at negative 0.5 kg, due to the louver on the back wall of the treatment chamber. Such a pressure system enables the apparatus to provide wood that is free from stains, informally roasted and safe from re-igniting.

Hence, it may now be better appreciated that according to the present invention, there is provided a method of roasting material such as wood by heating at high temperatures' which preferably comprises the following steps: a) creating a roasting profile for the wood using an algorithm that calculates temperature curves required to obtain the final color desired, these calculations being preferably based on wood type, thickness, length and average humidity level; b) subjecting the material such as wood to be roasted in an electric apparatus at very high temperature, based on the roasting profile, subjecting the wood to reach the "area of coloration"; c) interrupting the roasting treatment as soon as the program's calculated "anticipated area" gives the customer the desired color; and d) cooling and re-humidifying of wood.

Preferably, the atmospheric pressure during heating and roasting is maintained at about a positive 0.5 kg, thus enabling the pressure to evacuate through a water basin.

Preferably also, the atmospheric pressure during the cooling phase is controlled and maintained at approximately 0.25 to 0.5 kg of negative pressure.

Preferably also, the extracts drawn from the wood during the heating phases is removed from the surface of the wood by transverse airflow.

Preferably also, water is injected into the treatment chamber to aid in cooling and re-humidifying the wood.

Preferably also, the water basin is linked to the said treatment chamber by a gas pipe located at the upper part of the treatment chamber.

Preferably also, a specific volume of water in the water basin regulates the 0.5 kg of positive pressure.

Preferably also, the water basin acts as a dust and particle collector during the period where the apparatus operates with a positive pressure.

Preferably also, gases that exit through the water basin is combusted, before being released into the atmosphere.

Preferably also, during the cooling phase, a negative pressure is maintained at approximately 0.25 to 0.5 kg by an inward louver.

Preferably also, inward louver is approximately 2 to 10 cm in diameter and about 0.25 to 1.0 kg in weight.

Preferably also, transverse airflow circulates through the wood, enabling angled deflectors and scaled perforations to achieve a balanced airflow circulation throughout the pile of wood.

Preferably also, the balanced airflow due to perforated deflectors enable extracts drawn from the wood to collect on the walls and floor of the apparatus, rather than on the wood.

Preferably also, the wood is roasted without any resin or acid stains.

Preferably also, the area of coloration is determined by the operating software based on desired color.

Preferably also, the software automates the process based on the variables inputted and by measuring the temperature of the wood and air within the treatment chamber.

Preferably also, the software calculates the temperature curve necessary to roast at the desired color, using the shortest and most time efficient path, without risking cracking or burning said material.

Preferably also, the material is selected from the group consisting of aspen wood ("tremble" in French); maple wood ("érable" in French); birch wood ("bouleau" in French); and cherry wood ("merisier" in French). Preferably also, the material is any other soft or hard wood.

The process for stabilizing wood according to the present invention is particularly advantageous in that it enables the wood treated to remain stable over time.

As aforementioned, the process preferably includes the following steps: a) evaluation of wood; b) preparation of wood; c) preparation of stabilization software program; d) phase 1: heating (part 1); e) phase 2: heating (part 2); f) phase 3: stabilization of wood; g) phase 4: cool down; and h) phase 5: cool down and re-humidification.

According to the preferred embodiment of the present invention in regards to the evaluation of wood: the wood is identified by type, thickness, length and humidity level. Humidity level is evaluated as follows: wood chip samples are weighed. Then, the chips are microwave treated in two-minute increments and weighed again after each microwave session until the wood chip provides three (3) equal readings in a row. This indicates that there is no more moisture in the wood. From that, the moisture level is calculated using the original weight of the chips of wood and the weights after microwave treatments. Wood should contain no more than about 10% humidity, using the present machine, to ensure good quality wood that remains stable over time.

According to the preferred embodiment of the present invention in regards to the preparation of wood: load of wood is prepared for the machine with hollow spacers of approximately ½" square cross section. The load in put in machine. Three (3) thermocouples are entered 5" deep into ends of the wood, one near the top of the load, one near the middle and one near the bottom. With the help of a compressing jack, a preferred 11000-lbs load is applied to the top of the wood pile. This load is measured by a gage. This compressing jack minimizes warping and bending in the process. The door is sealed.

According to the preferred embodiment of the present invention in regards to the preparation of the roasting program: the variables for the wood load are entered in the program interface: type of wood, thickness, length, humidity level and desired color (desired color level, is directly proportional to dimensional stability of the end product). These factors are entered in the program interface before the machine is set into motion. Unlike other wood roasting apparatus, this one enables customers to specify a requirement for a specific level of wood stability, from lighter color to darker color. The program is launched, using the required data. The program is automated based on the input data and continuous temperature monitoring by the three thermocouples in the wood and one that measures ambient air temperature inside the machine.

According to the preferred embodiment of the present invention in regards to Phase 1: heating (part 1): during heating up, temperature slowly raised in the machine maintaining an approximate 75° C. difference between the treatment chamber temperature and the wood temperature. This process begins the dehumidification of the wood in a way that ensures it will not be ruined by cracking.

According to the preferred embodiment of the present invention in regards to Phase 2: heating (part 2): when the wood has reached the approximate intermediate temperature of about 180° C., the program reduces the gap between the chamber and the wood temperature, bringing the wood to the critical temperature.

According to the preferred embodiment of the present invention in regards to the Phase 3 (roasting): the third phase begins when the wood has reached the required critical temperature. During this stage, the wood begins to roast, hemicellulose being broken down and polymerized. Once the wood temperature curve crosses over the temperature line the program begins calculating the "area of coloration" every four (4) seconds. The "area of coloration" is the sum of the "area of coloration" already acquired+the "anticipated area". The program calculates what total "area of coloration" will give the desired color and then, with the "area already acquired", calculates when to start cool down so that total "area of coloration" does not exceed the desired value to achieve customer specified color. The critical temperature varies based on the type of wood. In addition, it should be noted that the area called "surface of coloration" varies based on the aforementioned variables, notably: desired color, length and thickness. The software running the machine creates a heating profile for the wood such that the surface of coloration will provide the desired wood color of final product. The greater the "area of coloration", the darker the coloration, irrelevant of the thickness of the wood. Taking into consideration the total "area of coloration" desired and the "area already acquired" at any given second/time, the program starts the cool down in such a way that the "anticipated area"+the "acquired area" gives the desired surface of coloration.

According to the preferred embodiment of the present invention in regards to Phase 4 (cooling and re-humidification): the heating elements are stopped. Air is allowed to circulate without added heat. External radiators are engaged to speed up the cooling process of the wood.

When the wood temperature has initially gone below the initial critical temperature, re-humidification begins. Water is sprayed inside the chamber, until the wood has reached approximate moisture content of about 0.5% to about 3.0%. This step aids in the cooling process (making cooling more efficient) and allows the wood to re-absorb moisture while it remains clamped in the compression jack. This step improves stability of the wood because it reaches near hygroscopic equilibrium while being maintained in a dimensionally stable clamp. As aforementioned, it should be noted that at this stage of the process, it is possible to inject stain, paint, perfume, plastic, protective liquid to coat the wood/or be absorbed by the wood during the cool down phase. When wood is taken out of the apparatus without re-injecting moisture the wood reaches hygroscopic equilibrium with its ambient environment, absorbing moisture from the air and potentially warping or bending. Therefore, the present process maximizes the stability of the end product by allowing the wood to reabsorb water in a controlled environment. External radiators continue working until the wood has cooled sufficiently to be taken out of the machine without any danger of re-igniting.

During all phases of the process according to the present invention, the following preferred considerations should be taken into account, as can be easily understood by a person skilled in the art.

In regards to atmospheric pressure and water valve: atmospheric pressure in the chamber is maintained at about 1 lb. The evacuation set up enables gases to escape the chamber through water while providing the apparatus with internal pressure control. The escaped gases are taken to a separate chamber where they are combusted.

In regards to calculated wood temperature (i.e. with thermocouples): the program is preferably calibrated to calculate the temperature in the center of the wood pile based on wood dimension using the temperature reading of a given distance (preferably, five (5) inches) from the end of the three different pieces of wood, one from the top of the pile, one from the middle and one from the bottom. The program takes an average value of the three (3) thermocouples, then applies a dimensional adjustment factor to approximate the temperature at the center of the pile.

In regards to air and exhaust flow: there is one deflector on each side of the chamber, normalizing flow across the stalk of wood, from the wood nearest the fans to furthest away. Exhaust gases and by-products (e.g. resins, acids, etc.) flow out to the sides of the chamber, directed by the ventilation. Gases then escape through the water valve. These deflectors are set at an angle, such that the wood furthest away from the heat source and fan have a greater amount of space for the air to circulate in. The deflectors are perforated with holes that increase in size further away from the fans. This allows for a balanced airflow in the transverse direction, through the spaces between rows of wood all along the length of the machine. This even balanced airflow further contributes to the assurance of a uniform product, clear of deposit residue.

In regards to resin and acid deposits: during the roasting process, the resins in coniferous wood and acids in deciduous wood are drawn to the surface. Because of transverse circulation through the chamber (processing/wood stack) area, these by-products are channeled to the outside walls of the chamber instead of being left to deposit on the wood. This transverse circulation through the chamber is central to the process as it ensures that the resins and acids do not stain the wood, leaving an even color throughout the product.

Hence, as may now be better appreciated from the above description, the present invention is a substantial improvement over the prior art in that, by virtue of its design and components, the apparatus represents important advantages over other related apparatuses known in the prior art, in terms of performance, applications, safety and costs.

Indeed, the present invention enables namely to: a) avoid for operators to make decisions regarding the outcome within the roasting apparatus and thus adversely affecting the uniformity of the wood to be treated because according to the present invention, there is provided a software use to automate the operations in the manner described hereinabove; b) the software used according to the present invention enables the machine to use the shortest possible route for roasting without danger of cracking; c) have angled and perforated deflectors combined with the fan thus creating a transverse airflow which enables to roast the wood with a uniform color from end to end; and d) avoid fire hazards.

The process according to the present invention is also advantageous in that not only does it enable to treat the wood in order to have improved physical properties, as discussed herein, but also enables to color the material being treated. This coloring of the material is preferably carried out by an injection of a very fluid dye. The carrying out of this application is preferably done as follows: the process applies itself only after the stabilizing period of the wood but does not require any torrefaction. The process enables for a multitude of choices of colors. Preferably, the process is applied during the normal period of required re-humidification, the application of the product being carried out preferably by the sprinkler system used for humidifying and/or cooling the wood, everything being preferably controlled by a corresponding operating software, in which case, this operating software will require a slight modification of the normal torrefaction and cooling time for the application of the product.

As also may now be better appreciated from the above-discussed, the process according to the present invention is also advantageous in that it enables the impregnation of previously scented water into the lignocellulosic material to be treated. Indeed, the process offers the possibility of treating with wood essences such as grey pine, white pine, fir or spruce. This application is preferably carried out as follows: after having torrefied the essence of the wood to the desired color (e.g. cedar), one only has to re-humidify with the scented water to the desired scent level (e.g. cedar). This step preferably applies itself after the normal torrefaction period of the wood and may be part of the required re-humidifying period, the application of the product being carried out preferably by the sprinkler system used for cooling the wood and controlled by the operating software, in which case the latter would preferably require a slight modification of the normal cooling time for the application of the product.

As also may now be better appreciated, the present invention is also advantageous in that the resulting treated material is a totally natural product, and in that the process according to the present invention, as explained above, enables to deliver predictable and consistent results, in terms of physical properties, color, scent, and the like.

The apparatus according to the present invention is preferably provided with precision controls, and designed to produce high quality, pollution free, competitively priced wood products for which new applications are poised to compete in the market place.

The process according to the present invention is also advantageous in that it is different from conventional heat treatments because it is done in an oxygen-deprived environment to prevent the wood from igniting, which means it is possible to heat the wood to high temperatures of between about 160° C. and 245° C. At these temperatures, the molecular structure of the wood is altered, enhancing some of the wood's physical properties, specifically its colour, dimensional stability and resistance to fungal decay, which is also very desirable.

More efficient than drying, the process according to the present invention eliminates the water and sap present in the wood, along with the absorbed water contained in the wood cells, reducing the moisture content of wood to practically 0%.

The apparatus according to the present invention is preferably devised to maximize productivity, while being easy to use and safe. The apparatus preferably comprises the following components, features and/or resulting advantages: a) high capacity wood load, preferably ranging from about 3,000 to about 5,000 fbm depending on the thickness of the wood; b) a durable construction in a preferred 304 grade stainless steel resisting corrosion and inclement weather, while delivering exceptional durability; c) efficient thermal insulation for improving working conditions and minimizing workplace accidents; d) a high performance centrifugal fan for preventing steam and smoke from infiltrating the workplace; e) a track loading system which facilitates loading and unloading; f) a computerized control system ensuring precision quality control; g) an off-gas burner for a safer, more environmentally friendly unit that helps minimize air emissions; h) a rapid treatment cycle (a 6- to 10-hour treatment cycle processes up to 20,000 fbm in 24 hours); i) low-cost energy (Quebec's low power prices leads to highly competitive global product); j) improved ventilation grille especially designed to ensure perfectly balanced air flow; k) readily accessible mechanical and electrical components for easy maintenance and emergency operations; l) an exhaust steam filtration for reducing fumes discharged into the atmosphere, minimizing environmental risks; m) an innovative press system for eliminating warping of upper rows of planks during the process; and n) an interior or exterior installation option, preferably with its stainless steel construction and high performance thermal insulation, for enabling the apparatus to be installed and operated outside all year round.

The process according to the present invention is also advantageous in that unlike chemical treatment processes, which alter the natural appearance of wood (for example the greenish tinge of treated wood), the present process actually enhances the natural intrinsic beauty of wood, giving added value to less popular species, because it gives everyday species a richer hue, similar to that of exotic wood species.

Other advantages resulting from material being treated with a process according to the present invention are the following: a) practically inexistent moisture content because treated wood has practically no (close to 0%) internal moisture and will not reabsorb moisture from the air or surface runoff since its hygroscopic properties are altered by the heating process; b) dimensional stability because the treated wood will not shrink, swell or warp with changing weather and moisture conditions—it is therefore ideal for precision applications such as furniture, doors and windows; c) resistance to biodegradation because treated wood is resistant to fungi and moulds, which mark and degrade wood, because fungi and moulds require a moisture content of at least 20% to develop; d) resistance to insect pests because the present process kills the cells on which wood insects and parasites feed, treated wood is thus much less likely to be attacked by pests, an important feature for the North American and European markets, where termite damage is a major concern; e) chemical free treatment process because the present process uses no chemicals or toxic substances—the production and use of treated wood is therefore safe and in compliance with the most stringent environmental and export standards. Moreover, wood treated according to the present process, unlike chemically treated wood, can be safely handled, transported and processed immediately; f) treated through to the core because unlike, chemical treatment, which protects only the surface layer of the wood, the present process affects the entire piece of wood through to the core-treated wood can, therefore, be processed, cut or sanded, without loosing any of its properties: cut ends remain protected, and scratches and cracks are essentially invisible; and g) a great variety of hues and consistent colour because the present process can enrich the hue and appearance of practically all species, which opens up new possibilities for many species that have never been considered aesthetically pleasing.

Being more durable, more stable and aesthetically more pleasing than natural and chemically treated wood, wood treated according to the present invention is an ideal choice for a broad range of applications: a) outdoor structures (e.g. fences; garden furniture; patios and pergolas; and wood siding); b) finishes (e.g. floors; cabinetry; mouldings; kitchen cabinets; and components and furniture); and c) specialty products (e.g. caskets; educational and recreational toys; resonance chambers for musical instruments; and clock components).

Of course, numerous modifications could be made to the above-described embodiments without departing from the scope of the invention, as defined in the appended claims.

The invention claimed is:

1. A process for treating lignocellulosic material, the process comprising the steps of:
   a) providing lignocellulosic material;
   b) evaluating parameters of the lignocellulosic material;
   c) preparing the lignocellulosic material;
   d) heating the lignocellulosic material in a treatment chamber following a given profile based on parameters of the lignocellulosic material;
   e) stabilizing the lignocellulosic material; and
   f) cooling down the lignocellulosic material;
   wherein a gas pipe opens near a top portion of the treatment chamber; wherein a water basin is filled with a volume of water for maintaining about 0.5 kg of positive pressure inside the treatment chamber during step c); wherein gases are evacuated by the gas pipe when the pressure inside the treatment chamber becomes greater than about 0.5 kg; wherein the gases are led to the water basin, wherein dust and particles are left in the water itself, and wherein residual gases are allowed to continue onward to an evacuation pipe; and wherein the gases are entered from the evacuation pipe and into a combustion chamber, and wherein said gases are burnt by a gas inside the combustion chamber.

2. A process according to claim 1, wherein parameters of the lignocellulosic material are selected from the group consisting of type of material, thickness, length and humidity level.

3. A process according to claim 1, wherein step b) comprises the step of selecting lignocellulosic material having a maximum humidity level of about 10%.

4. A process according to claim 1, wherein step c) comprises the step of stacking a plurality of lignocellulosic material each being separated with hollow tubing spacers.

5. A process according to claim 1, wherein step c) comprises the step of clamping down the lignocellulosic material to be treated.

6. A process according to claim 5, wherein the step of clamping down comprises the step of applying a pressure of about 50 kg to about 75 kg throughout the lignocellulosic material to be treated; and wherein the step of clamping down is carried out with a compression jack.

7. A process according to claim 1, wherein step c) comprises the step of inserting thermocouples at opposite ends of the lignocellulosic material to be treated.

8. A process according to claim 1, wherein step c) comprises the step of inserting thermocouples along the lignocellulosic material to be treated.

9. A process according to claim 1, wherein step b) comprises the step of calculating a theoretical area of coloration of the lignocellulosic material.

10. A process according to claim 1 wherein step d) comprises the step of providing the lignocellulosic material with a transverse airflow as well as a positive pressure upon heating.

11. A process according to claim 1, wherein step d) comprises the step of providing deflectors being located at an angle on both sides of the lignocellulosic material.

12. A process according to claim 11, wherein the deflectors are perforated with holes that are proportional to a distance from a heater and a fan of the treatment chamber so as to ensure a uniform airflow in said treatment chamber.

13. A process according to claim 1, wherein step d) comprises the step of monitoring via corresponding thermocouples the temperature of the lignocellulosic material and the temperature of ambient air in the treatment chamber.

14. A process according to claim 1, wherein step d) comprises the step of maintaining a given required pressure in the treatment chamber by means of a louver, a gas pipe and a water basin operatively connected to said treatment chamber.

15. A process according to claim 14, wherein the louver is located half way up in the treatment chamber; wherein the louver weighs about 0.25 kg to about 1.0 kg; and wherein the louver has a diameter ranging from about 2 cm to about 10 cm.

16. A process according to claim 1, wherein step d) further comprises the step of heating the lignocellulosic material from an original temperature to an intermediate temperature of about 120° C.; wherein step d) further comprises the step of maintaining a minimum temperature differential of about 75° C. between the temperature of the treatment chamber and the temperature of the lignocellulosic material based on parameters of the lignocellulosic material; wherein step d) further comprises the step of heating the lignocellulosic material from its intermediate temperature of about 120° C. to a critical temperature of about 180° C. so as to further reduce moisture of the lignocellulosic material to a range of about 0% to about 2%; wherein step d) further comprises the step of breaking down and polymerizing hemicellulose of the lignocellulosic material; wherein step d) further comprises the step of heating the lignocellulosic material from its critical temperature of about 180° C. to a ceiling temperature not exceeding about 225° C. for roasting the lignocellulosic material and providing the same with a desired color; and wherein step e) comprises the step of providing the lignocellulosic material with a negative pressure in the treatment chamber in view of step f).

17. A process according to claim 1, wherein step f) comprises the step of circulating air in the treatment chamber; wherein step f) comprises the step of operatively connecting external radiators to the treatment chamber and activating the same for accelerating cooling of the lignocellulosic material; wherein step f) comprises the step of providing water sprinklers for re-injecting water into the treatment chamber during cool down of the lignocellulosic material for accelerating cooling of the lignocellulosic material;
   wherein water is re-injected until a humidity level ranging from about 0.5% to about 3.0% is attained in the lignocellulosic material; wherein step f) comprises the step of injecting an external fluid into the treatment chamber for absorbing of the same by the lignocellulosic material;
   wherein the fluid is selected from the group consisting of stain, paint, perfume, plastic and protective liquid; and wherein step f) comprises the step of joining the treatment chamber to a water basin via a gas pipe.

18. A process according to claim 1, wherein the gas used is propane; wherein gas emissions from the combustion chamber are released out into the atmosphere by evacuating means; wherein the evacuation means is a chimney; wherein the lignocellulosic material is wood selected from the group consisting of aspen wood, maple wood, birch wood, cherry wood, spruce wood, oak wood, white pine wood, yellow birch wood, beech wood, ash wood; wherein by-products of the lignocellulosic material are drawn out to a surface thereof during step d); and wherein the by-products are channeled to outside walls of the treatment chamber via a transversal air circulation provided within said treatment chamber.

* * * * *